(12) United States Patent
Brunswick

(10) Patent No.: US 9,327,219 B2
(45) Date of Patent: May 3, 2016

(54) SPIRAL IRRIGATION FILTER CLEANING APPARATUS

(71) Applicant: James J. Brunswick, Grand Junction, CO (US)

(72) Inventor: James J. Brunswick, Grand Junction, CO (US)

( * ) Notice: Subject to any disclaimer, the term of this patent is extended or adjusted under 35 U.S.C. 154(b) by 304 days.

(21) Appl. No.: 14/104,414

(22) Filed: Dec. 12, 2013

(65) Prior Publication Data

US 2015/0165354 A1 Jun. 18, 2015

(51) Int. Cl.
*B01D 29/15* (2006.01)
*B01D 29/64* (2006.01)
*B01D 29/11* (2006.01)

(52) U.S. Cl.
CPC .......... *B01D 29/6476* (2013.01); *B01D 29/114* (2013.01); *B01D 29/15* (2013.01)

(58) Field of Classification Search
None
See application file for complete search history.

(56) References Cited

U.S. PATENT DOCUMENTS

| | | | | | |
|---|---|---|---|---|---|
| 950,118 | A | * | 2/1910 | Rood | B01D 29/118 210/107 |
| 1,033,745 | A | * | 7/1912 | Smith | B01D 29/114 210/107 |
| 2,332,965 | A | * | 10/1943 | Ducommun | B01D 29/114 210/460 |
| 3,695,443 | A | | 10/1972 | Schmidt, Jr. | |
| 5,500,134 | A | | 3/1996 | Chahine | |
| 5,863,443 | A | | 1/1999 | Mainwaring | |
| 5,897,787 | A | | 4/1999 | Keller | |
| 6,575,307 | B2 | | 6/2003 | Lockwood | |
| 6,719,900 | B2 | | 4/2004 | Hawkins | |
| 7,718,055 | B2 | * | 5/2010 | Iou | E04D 13/0409 210/156 |

FOREIGN PATENT DOCUMENTS

GB 2337948 A * 8/1999
JP 08243319 A * 9/1996

* cited by examiner

*Primary Examiner* — Thomas M Lithgow
(74) *Attorney, Agent, or Firm* — Dale J. Ream

(57) ABSTRACT

A spiral irrigation filter cleaning apparatus includes a filter framework having a tubular wall defining a plurality of apertures, the filter framework having a platform extending outwardly from the lower end. A filter media is constructed of a flexible and permeable material configured to wrap around the filter framework. The cleaning apparatus includes a cleaning assembly configured to surround the filter framework. The cleaning assembly includes an upper ring and an opposed lower ring, the lower ring configured to rest freely upon the platform. The cleaning assembly further includes a plurality of spaced apart scraping members each having an upper end coupled to the upper ring and a lower end coupled to the lower ring and extending in a spiral configuration. A plurality of turbine blades is coupled to an outer surface of the upper ring to urge the cleaning assembly to rotate when contacted by a water stream.

19 Claims, 6 Drawing Sheets

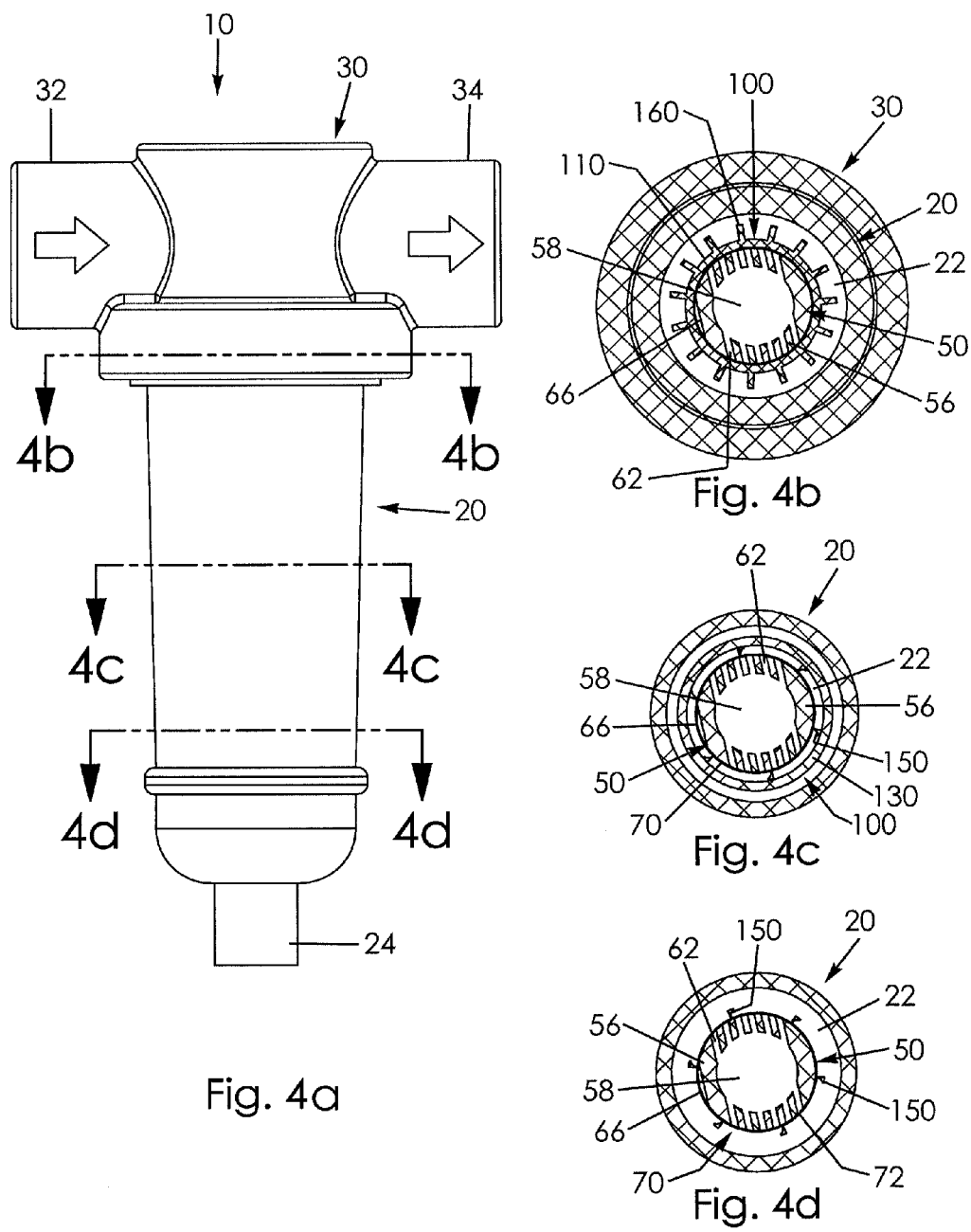

SPIRAL IRRIGATION FILTER CLEANING APPARATUS

BACKGROUND OF THE INVENTION

This invention relates generally to irrigation filter devices and, more particularly, to a cleaning apparatus for use in an existing T-irrigation filter and which includes a plurality of spiral scraping members configured to scrape debris from an outer surface of a filter media and which is axially rotated as a water stream flows through the T-irrigation filter.

A T-irrigation water filter device operates to filter impurities from a water stream passing through the filter. A traditional T-irrigation device includes an inlet for receiving a water stream and directs it to enter a body cavity in a swirling motion before passing out of an outlet port. A filter element is positioned in the body cavity and is constructed so as to catch and remove debris from the water stream. Unfortunately, the filter element may become clogged or rendered ineffective as sediment builds up on the outer surface of the filter. A clogged filter element must be manually cleaned or removed and replaced whenever it becomes clogged with debris. This requires that the body of the T-irrigation device be taken apart, the filter media manually cleaned by hand or vigorously flushed with water, and the T-irrigation filter device put back together.

Therefore, it would be desirable to have a spiral irrigation filter apparatus having a cleaning assembly that may be inserted into an existing T-irrigation filter device and is configured to scrape debris from an outer surface of a filter media when a water stream flows through the T-irrigation filter. Further, it would be desirable to have a spiral irrigation filter apparatus having a plurality of turbine blades configured to cause the cleaning assembly to rotate when contacted by the water stream. In addition, it would be desirable to have a spiral irrigation filter apparatus having a plurality of scraping members having a spiral configuration that effectively scrape debris from the filter media when rotated by the water stream.

SUMMARY OF THE INVENTION

A spiral irrigation filter cleaning apparatus for use with a T-irrigation filter device includes a filter framework having opposed upper and lower ends and a generally tubular wall extending therebetween that includes a perforated section defining a plurality of apertures, the filter framework having at least one platform extending outwardly from the lower end. A filter media is constructed of a flexible and permeable material configured to wrap around the filter framework. The cleaning apparatus includes a cleaning assembly configured to surround the filter framework. The cleaning assembly includes an upper ring and an opposed lower ring, the lower ring configured to rest freely upon the at least one platform. The cleaning assembly further includes a plurality of spaced apart scraping members each having an upper end coupled to a lower surface of the upper ring and a lower end coupled to an upper surface of the lower ring and extending in a spiral configuration therebetween. A plurality of turbine blades are spaced apart about an outer surface of the upper ring, each turbine blade being configured to urge the cleaning assembly to rotate when contacted by the stream of water passing thereby.

Therefore, a general object of this invention is to provide an irrigation filter cleaning apparatus for use with an existing T-irrigation filter device that includes filter media and scrapes debris therefrom as a water stream flows therethrough in normal course.

Another object of this invention is to provide an irrigation filter cleaning apparatus, as aforesaid, having a plurality of scraping members arranged in a spiral configuration and configured to scrape debris from an exterior of a filter media.

Still another object of this invention is to provide an irrigation filter cleaning apparatus, as aforesaid, having a plurality of turbine blades configured to rotate the scraping members whenever the water stream flows.

Yet another object of this invention is to provide an irrigation filter cleaning apparatus, as aforesaid, that may be inserted easily into an existing T-irrigation filter device.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a sectional view taken along line 3b-3b of FIG. 3a;

FIG. 3c is a sectional view taken along line 3c-3c of FIG. 3a;

FIG. 3d is a sectional view taken along line 3d-3d of FIG. 3a;

FIG. 4a is a side view of the cleaning apparatus as in FIG. 1;

FIG. 4b is a sectional view taken along line 4b-4b of FIG. 4a;

FIG. 4c is a sectional view taken along line 4c-4c of FIG. 4a;

FIG. 4d is a is a sectional view taken along line 4d-4d of FIG. 4a;

FIG. 6a is a side view from another angle of the filter cleaning apparatus as in claim 1; and FIG. 6b is a sectional view taken along line 6b-6b of FIG. 6a.

DESCRIPTION OF THE PREFERRED EMBODIMENT

Figure 1:
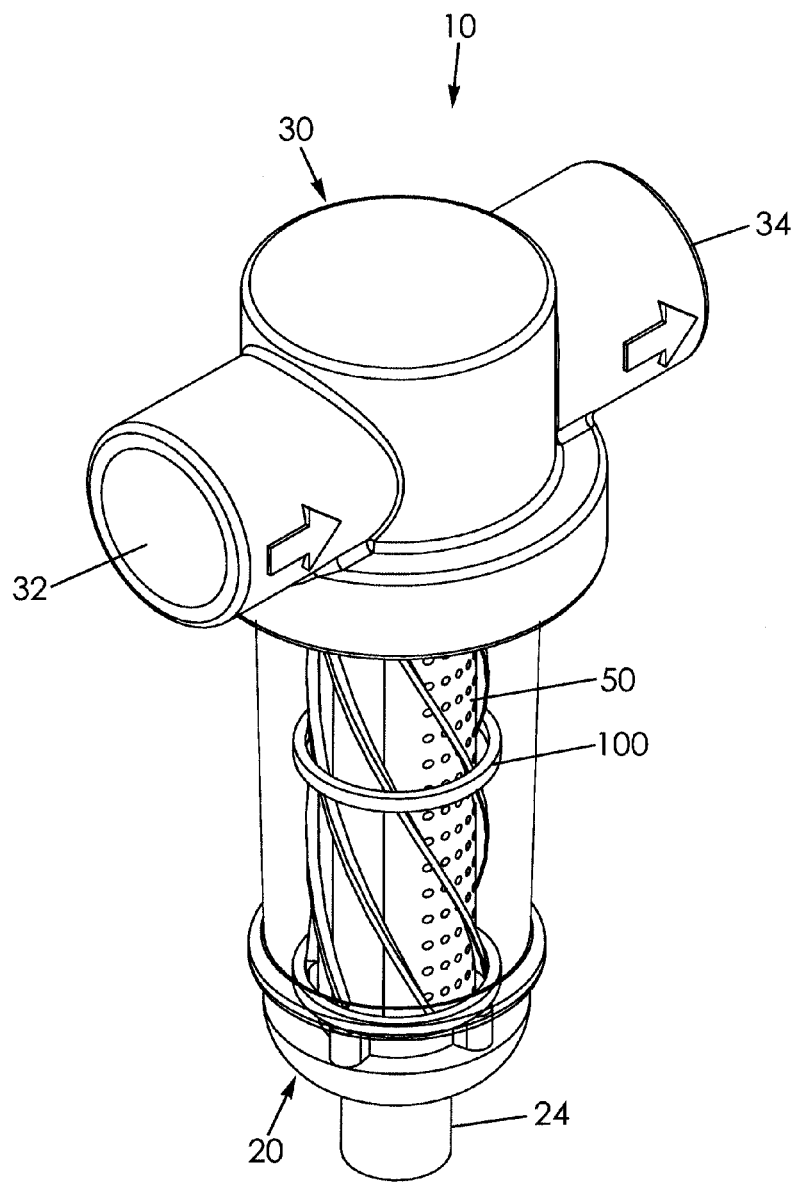
FIG. 1 is a perspective view of a spiral irrigation filter cleaning apparatus according to a preferred embodiment of the present invention.
Figure 2:
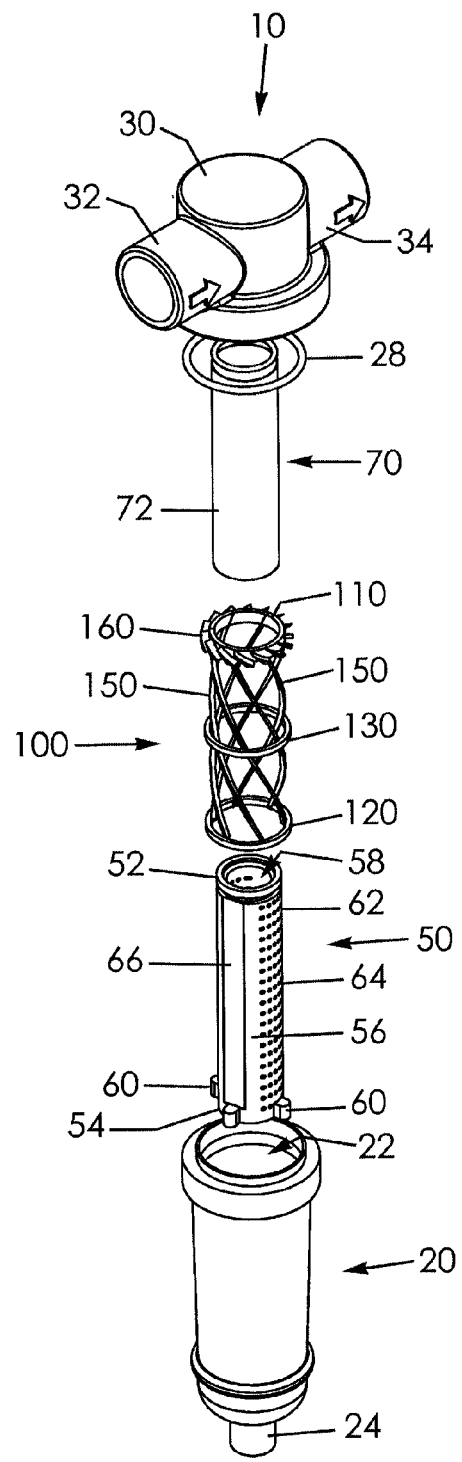
FIG. 2 is an exploded view of the filter cleaning apparatus as in FIG. 1.

A spiral irrigation filter cleaning apparatus, also referred to simply as a filter cleaning apparatus, according to a preferred embodiment of the present invention will now be described in detail with reference to FIGS. 1 to 6b of the accompanying drawings. The filter cleaning apparatus 10 includes a filter framework 50, a filter media 70, and a cleaning assembly 100.

The filter framework 50 includes an upper end 52, an opposed lower end 54, and a wall 56. The wall 56 has a generally tubular configuration extending between the upper end 52 and the lower end 54 of the filter framework 50 so as to define an interior area 58. The wall 56 of the filter framework 50 includes a perforated section 64 defining a plurality of spaced apart apertures 62. Each aperture 62 is in communication with the interior area 58 of the filter framework 50.

The filter media 70 is constructed of a flexible and permeable material and is configured to wrap around the filter framework 50. More particularly, the filter media 70 is configured to cover each aperture 62 of the filter framework 50. In use, water flows from outside the filter media 70 to the interior area 58 of the filter framework 50 by first flowing through the filter media 70 and then flowing through the apertures 62 of the filter framework 50.

As water flows through the filter media 70, debris located in the water may collect on an outer surface 72 of the filter media 70. The permeability of the filter media 70 may vary as necessary to meet water purity and flow requirements. For example, a filter media 70 having a course mesh may allow too much debris to flow through the filter media 70. A filter media 70 having a fine mesh, however, may not allow enough water to flow through the filter media 70 and/or may collect too much debris on the outer surface 72 of the filter media 70.

Figure 5:
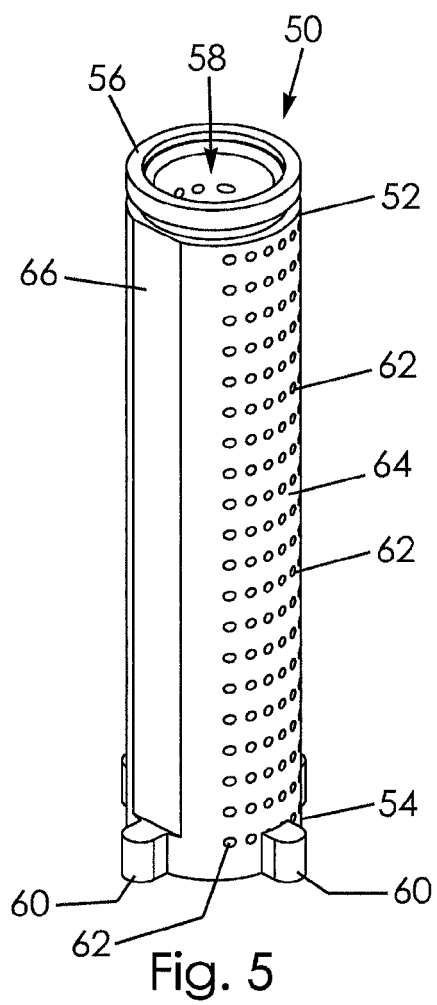
FIG. 5 is a perspective view of a filter framework removed from the filter cleaning apparatus as in FIG. 2.

In use, the cleaning assembly 100 cleans contaminants and debris from the outer surface 72 of the filter media 70 as the cleaning assembly 100 axially rotates around the filter framework 50. The cleaning assembly 100 is configured to surround the filter framework 50 and may freely rest upon a platform 60. The platform 60 may extend outwardly from the lower end 54 of the filter framework 50. In one embodiment, a plurality of platforms 60 may extend outwardly from the lower end 54 of the filter framework 50 (FIG. 5).

The cleaning assembly 100 includes an upper ring 110, a lower ring 120, and a plurality of spaced apart scraping members 150. The lower ring 120 may be configured to rest freely upon the platform 60 or plurality of platforms 60. Each scraping member 150 extends in a spiral configuration between the upper 110 and lower 120 rings. The upper ring 110 includes a lower surface 114 and an outer surface 116. The upper ring 110 may also include an upper surface 112 and/or an inner surface 118. The lower ring 120 includes an upper surface 122 and may also include a lower surface 124, an outer surface 126, and/or an inner surface 128. Each scraping member 150 has an upper end 152 coupled to the lower surface 114 of the upper ring 110 and a lower end 154 coupled to the upper surface 122 of the lower ring 120.

The cleaning assembly 100 may include at least one stabilizer ring 130 coupled to the plurality of spaced apart scraping members 150. The stabilizer ring 130 may include an upper surface 132, a lower surface 134, an outer surface 136 and/or an inner surface 138. The stabilizer ring 130 is downwardly displaced from the upper ring 110 and upwardly displaced from the lower ring 120. Preferably, each scraping member 150 is coupled to the inner surface 138 of the stabilizer ring 130.

Figure 3A:
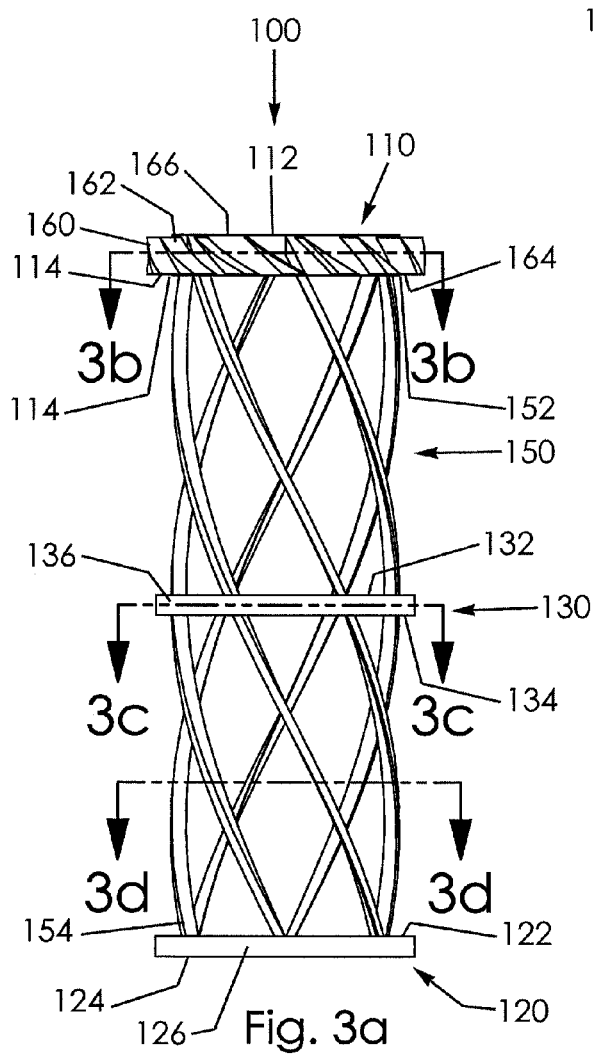
FIG. 3a is a side view of a cleaning assembly removed from the filter cleaning apparatus as in FIG. 2.
Figure 3B:
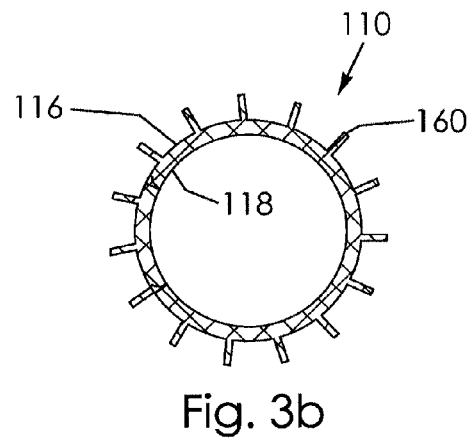
Figure 3C:
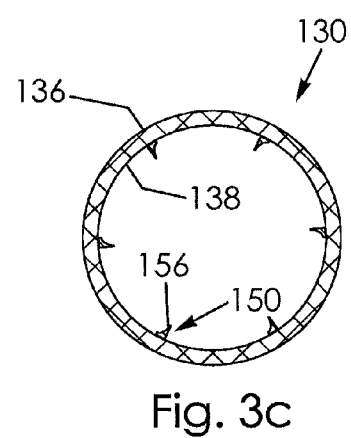
Figure 3D:
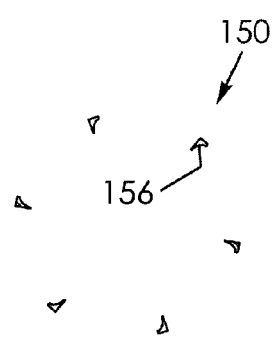

Each scraping member 150 includes a scraping edge 156 (FIG. 3c). Each scraping edge 156 is configured to contact the outer surface 72 of the filter media 70 as the cleaning assembly 100 axially rotates around the filter framework 50 as will be described further below. The scraping edge 156 of each scraping member 150 may extend between the upper 110 and lower 120 rings of the cleaning assembly 100. Each scraping member 150 may be flexible so as to maintain contact between each scraping edge 156 and the filter media 70 as the cleaning assembly 100 rotates around the filter framework 50. The inner surface 138 of the stabilizer ring 130 may be offset from the scraping edges 156 of the scraping members 150 such that the stabilizer ring 130 does not contact the filter media 70 or conflict with movement of the filter framework 50.

The filter media 70 may include a seam (not shown). The wall 56 of the filter framework 50 may include a recessed area 66 that is configured to receive the seam (not shown) of the filter media 70 so that the seam (not shown) of the filter media 70 does not prevent the cleaning assembly 100 from rotating around the filter framework 50. The recessed area 66 of the wall 56 of the filter framework 50 may not include a perforated section 64.

Figures 6A, 6B:
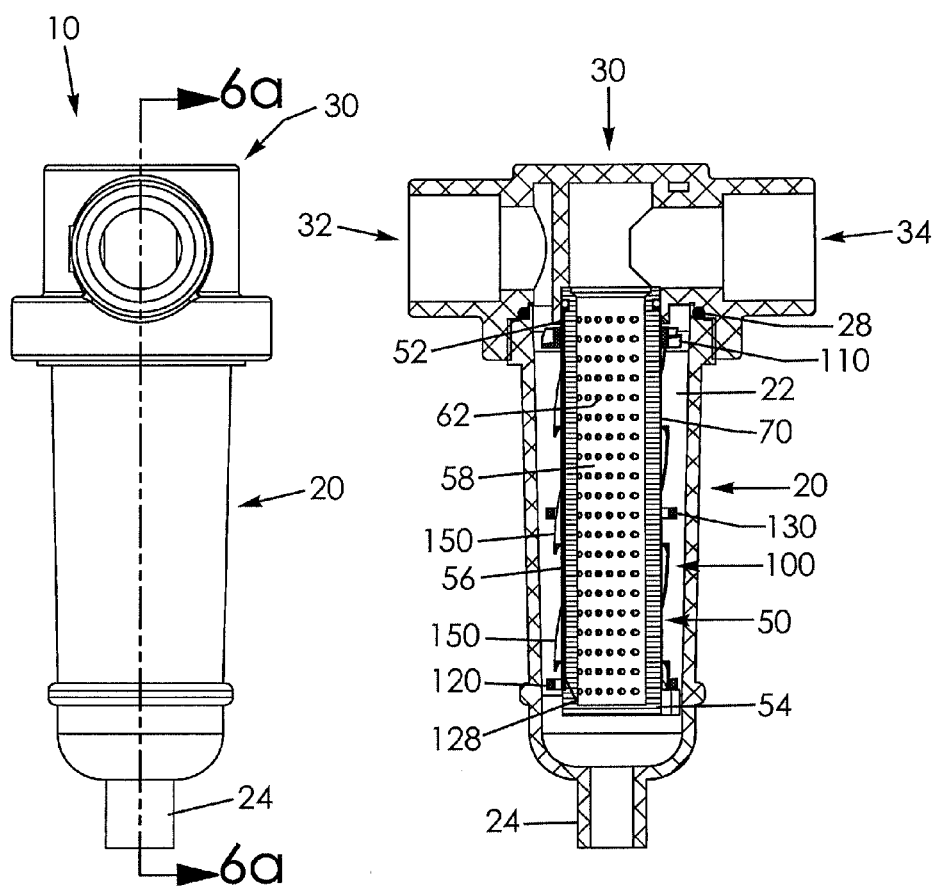

The filter cleaning apparatus 10 may include a body portion 20 that defines a body cavity 22 (FIG. 6b). The body cavity 22 may be configured to receive the filter framework 50 and the cleaning assembly 100. The body portion 20 may include a sediment trap 24. The sediment trap 24 may be a sediment flush valve 24 that may be selectively opened to remove collected sediment.

The filter cleaning apparatus 10 may also include a top portion 30 removably coupled to the body portion 20. The top portion 30 may have an inlet port 32 and an outlet port 34. The inlet port 32 may be configured to receive a water stream and to guide the water stream into the body cavity 22 of the body portion 20. The outlet port 34 is in communication with the interior area 58 of the filter framework 50 and is configured to receive a stream of water from the body cavity 22. A top seal 28 may be positioned between the top portion 30 and the body portion 20 so as to prevent air or water from entering or exiting the body cavity 22 of the body portion 20 at the location where the body portion 20 is coupled to the top portion 30.

The cleaning assembly 100 may include a plurality of turbine blades 160. The turbine blades 160 may be spaced apart about the outer surface 116 of the upper ring 110 of the cleaning assembly 100 (FIG. 3b). Each turbine blade 160 may include a top surface 162 and an opposed bottom surface 164 extending outwardly from the upper ring 110. The top 162 and bottom 164 surfaces may both extend downwardly from a top edge 166 of the turbine blade 160. Each turbine blade 160 may be configured to urge the cleaning assembly 100 to rotate about the filter framework 50 when contacted by the stream of water passing thereby.

In use, a stream of supply water flows into the filter cleaning apparatus 10 through the inlet port 32 of the top portion 30 and into the body cavity 22 of the body portion 20. The supply water is then filtered as it flows from the body cavity 22 of the body portion 20 through the filter media 70. Filtered water then flows through the plurality of apertures 62 and into the interior area 58 of the filter framework 50. As the stream of supply water continues to flow into the filter cleaning apparatus 10, filtered water located in the interior area 58 of the filter framework 50 is forced to flow out of the filter cleaning apparatus 10 through the outlet port 34 of the top portion 30.

As supply water flows from the body cavity 22 of the body portion 20 through the filter media 70, debris may collect on the outer surface 72 of the filter media. As the stream of water flows past the turbine blades 160, the turbine blades 160 urge the cleaning assembly 100 to rotate around the filter framework 50. As the cleaning assembly 100 rotates around the filter framework 50, the scraping members 150 of the cleaning assembly 100 scrape debris off of the outer surface 72 of the filter media 70. Debris may collect in the sediment trap 24 or may be flushed out through the sediment flush valve 26.

It is understood that while certain forms of this invention have been illustrated and described, it is not limited thereto except insofar as such limitations are included in the following claims and allowable functional equivalents thereof.

The invention claimed is:
1. A spiral irrigation filter cleaning apparatus for use with a T-irrigation filter device that receives a stream of water, comprising:
a filter framework having opposed upper and lower ends and a generally tubular wall extending therebetween that includes a perforated section defining a plurality of aper- tures, said filter framework having at least one platform extending outwardly from said lower end;
a filter media constructed of a flexible and permeable material configured to wrap around said filter framework;
a cleaning assembly configured to surround said filter framework, said cleaning assembly including:
  an upper ring and an opposed lower ring, said lower ring configured to rest freely upon said at least one platform;
  a plurality of spaced apart scraping members each having an upper end coupled to a lower surface of said upper ring and a lower end coupled to an upper surface of said lower ring and extending in a spiral configuration therebetween; and
  a plurality of turbine blades spaced apart about an outer surface of said upper ring, each turbine blade being configured to urge said cleaning assembly to rotate about said filter framework when contacted by the stream of water passing thereby.

2. The spiral irrigation filter cleaning apparatus as in claim 1, further comprising:
a body portion defining a body cavity configured to receive said filter framework and said cleaning assembly; and
a top portion removably coupled to said body portion, said top portion having an inlet port configured to receive the water stream and to guide the water stream into said body cavity and having an outlet port for receiving the water from said body cavity.

3. The spiral irrigation filter cleaning apparatus as in claim 2, wherein said body portion is at least partially transparent.

4. The spiral irrigation filter cleaning apparatus as in claim 2, wherein said body portion includes a sediment trap.

5. The spiral irrigation filter cleaning apparatus as in claim 1, wherein each scraping member includes a scraping edge configured to contact an outer surface of said filter media when the cleaning assembly axially rotates around said filter framework.

6. The spiral irrigation filter cleaning apparatus as in claim 5, wherein each scraping edge extends between said upper and lower rings.

7. The spiral irrigation filter cleaning apparatus as in claim 5, wherein each scraping member is flexible so as to maintain contact between said scraping edge and said filter media when said cleaning assembly rotates around said filter framework.

8. The spiral irrigation filter cleaning apparatus of claim 1, wherein said wall of said filter framework includes a recessed area configured to receive a seam of said filter media.

9. The spiral irrigation filter cleaning apparatus of claim 8, wherein said recessed area of said wall of said filter framework does not include a perforated section.

10. The spiral irrigation filter cleaning apparatus of claim 1, wherein said cleaning assembly includes at least one stabilizer ring coupled to said plurality of spaced apart scraping members, said stabilizing ring being downwardly displaced from said upper ring and upwardly displaced from said lower ring.

11. The spiral irrigation filter cleaning apparatus as in claim 1, wherein each turbine blade includes opposed top and bottom surfaces extending from a top edge of each turbine blade.

12. A spiral irrigation filter cleaning apparatus for use with a T-irrigation filter device, comprising:
a filter framework having opposed upper and lower ends and a generally tubular wall extending therebetween that includes a perforated section defining a plurality of spaced apart apertures, said filter framework having at least one platform extending outwardly from said lower end;
a filter media constructed of a flexible and permeable material configured to wrap around said filter framework;
a cleaning assembly configured to surround said filter framework, said cleaning assembly including:
  an upper ring and an opposed lower ring, said lower ring configured to rest freely upon said at least one platform;
  a plurality of spaced apart scraping members each having an upper end coupled to a lower surface of said upper ring and a lower end coupled to an upper surface of said lower ring and extending in a spiral configuration therebetween;
  a plurality of turbine blades spaced apart about and extending outwardly from an outer surface of said upper ring, each turbine blade being configured to urge said cleaning assembly to rotate about said filter framework when contacted by the stream of water passing thereby;
a body portion defining a body cavity configured to receive said filter framework and said cleaning assembly; and
a top portion removably coupled to said body portion, said top portion having an inlet port configured to receive a water stream and to guide the water stream into said body cavity and having an outlet port for receiving the water stream from said body cavity.

13. The spiral irrigation filter cleaning apparatus as in claim 12, wherein each scraping member includes a scraping edge configured to contact said filter media when said filter media is wrapped around said filter framework and said cleaning assembly surrounds said filter framework.

14. The spiral irrigation filter cleaning apparatus as in claim 13, wherein each scraping edge extends between said upper and lower rings.

15. The spiral irrigation filter cleaning apparatus as in claim 14, wherein each scraping member is flexible so as to maintain constant contact between said scraping edge and said filter media when said cleaning assembly rotates about said filter framework.

16. The spiral irrigation filter cleaning apparatus of claim 15, wherein said filter framework includes a recessed area configured to receive a seam of said filter media.

17. The spiral irrigation filter cleaning apparatus of claim 16, wherein said recessed area of said filter framework includes a non-perforated surface.

18. The spiral irrigation filter cleaning apparatus of claim 17, wherein said cleaning assembly includes at least one stabilizer ring coupled to said plurality of spaced apart scraping members, said support ring being downwardly displaced from said upper ring and upwardly displaced from said lower ring.

19. The spiral irrigation filter cleaning apparatus as in claim 18, wherein each turbine blade includes opposed top and bottom surfaces extending from a top edge of each turbine blade.

* * * * *